US009824873B2

(12) United States Patent
Brekenfeld et al.

(10) Patent No.: US 9,824,873 B2
(45) Date of Patent: Nov. 21, 2017

(54) IONIZATION CHAMBER WITH TEMPERATURE-CONTROLLED GAS FEED (71) Applicant: Bruker Daltonik GmbH, Bremen (DE)

(72) Inventors: Andreas Brekenfeld, Bremen (DE); Martin Engel, Edewecht (DE)

(*) Notice: Subject to any disclaimer, the term of this patent is extended or adjusted under 35 U.S.C. 154(b) by 0 days.

(21) Appl. No.: 14/826,388

(22) Filed: Aug. 14, 2015

(65) Prior Publication Data

US 2016/0086784 A1 Mar. 24, 2016

(30) Foreign Application Priority Data

Sep. 18, 2014 (DE) .................. 10 2014 113 482

(51) Int. Cl.
*H01J 49/00* (2006.01)
*H01J 49/04* (2006.01)
*H01J 49/10* (2006.01)

(52) U.S. Cl.
CPC ........ *H01J 49/0486* (2013.01); *H01J 49/045* (2013.01); *H01J 49/0422* (2013.01); *H01J 49/10* (2013.01)

(58) Field of Classification Search
CPC ........ H01J 49/00; H01J 49/0095; H01J 49/02; H01J 49/04; H01J 49/0404; H01J 49/0409; H01J 49/0413; H01J 49/0422; H01J 49/0427; H01J 49/0468; H01J 49/0472; H01J 49/0477; H01J 49/0486
USPC ............. 250/423 R, 425, 424, 281, 282, 288
See application file for complete search history.

(56) References Cited

U.S. PATENT DOCUMENTS

| 4,968,885 | A |   | 11/1990 | Willoughby |        |
|-----------|---|---|---------|------------|--------|
| 5,412,208 | A | * | 5/1995  | Covey      | G01N 30/7246 250/281 |
| 6,278,111 | B1| * | 8/2001  | Sheehan    | H01J 49/165 250/281 |
| 6,632,404 | B1| * | 10/2003 | Freitag    | B01L 3/567 137/247 |
| 8,044,346 | B2|   | 10/2011 | Kostiainen et al. | |
| 2002/0070672 | A1 | | 6/2002 | Horsky     |        |

(Continued)

FOREIGN PATENT DOCUMENTS

CN          202196744 B1   4/2012
WO          93/21120 A1   10/1993
(Continued)

OTHER PUBLICATIONS

Dimitriev et al., History of Sol-Gel Science and Technology (Review), Journal of the University of Chemical Technology and Metallurgy, vol. 43, 181-192, 2008.

*Primary Examiner* — Jason McCormack
(74) *Attorney, Agent, or Firm* — Benoit & Côté Inc.

(57) ABSTRACT

The invention relates to an ionization chamber for connection to a mass spectrometer. The ionization chamber has a temperature-control block with a gas inlet and a gas channel which starts at the gas inlet and leads into a gas outlet. A temperature-control device is positioned along the gas channel and ensures that a gas flowing in the gas channel is brought to a specific temperature, i.e. it is heated or cooled, before it enters the ionization chamber. The temperature-control block has a formed part into which a structure of the gas channel is incorporated and which is fabricated by means of a sol-gel process, for example out of a glass or ceramic material.

20 Claims, 5 Drawing Sheets

(56) References Cited

U.S. PATENT DOCUMENTS

| | | | |
|---|---|---|---|
| 2004/0118189 A1 | 6/2004 | Karp et al. | |
| 2004/0206399 A1 | 10/2004 | Heller et al. | |
| 2005/0109767 A1* | 5/2005 | Fennewald | B29C 45/2737 219/543 |
| 2006/0255255 A1* | 11/2006 | Miller | H01J 49/0018 250/281 |
| 2007/0128078 A1* | 6/2007 | Sarrut | B01L 3/502707 422/400 |
| 2007/0243652 A1* | 10/2007 | Bour | C23C 16/303 438/46 |
| 2009/0159790 A1 | 6/2009 | Kostiainen et al. | |
| 2009/0250608 A1* | 10/2009 | Mordehai | H01J 49/167 250/288 |
| 2011/0181313 A1* | 7/2011 | Sasaki | H01L 21/67248 324/750.03 |
| 2011/0266433 A1* | 11/2011 | Jarrell | G01N 30/7206 250/282 |
| 2013/0213150 A1* | 8/2013 | Covey | H01J 49/0422 73/863.41 |

FOREIGN PATENT DOCUMENTS

| | | |
|---|---|---|
| WO | 98/11595 A1 | 3/1998 |
| WO | 0153225 A1 | 7/2001 |
| WO | 2009124298 A2 | 10/2009 |

\* cited by examiner

IONIZATION CHAMBER WITH TEMPERATURE-CONTROLLED GAS FEED

BACKGROUND OF THE INVENTION

Field of the Invention

The invention relates to an ionization chamber to be connected to a mass spectrometer.

Description of the Related Art

In mass spectrometry, ionization chambers serve to provide gaseous phase ions from analytical samples, said ions being separated in a low-pressure region of a suitable mass analyzer according to their mass-to-charge ratio m/z and registered by a suitable detector. The chambers are usually isolated from their surroundings by means of a gas-tight enclosure in order to prevent the ambient atmosphere from interfering with the sample, and they usually contain only a few, well-defined fluid inflow and fluid outflow openings, such as a sample injector, an exhaust gas outlet or an ion transfer aperture to the vacuum stage of the mass analyzer.

The prior art provides different types of ionization methods, of which only a few are mentioned here by way of example: electrospray (ESI), thermospray, matrix-assisted laser desorption and ionization (MALDI), electron impact ionization (EI), chemical ionization in both the atmospheric as well as the low pressure range (APCI or CI) and the like.

In some cases, the ionization process can be improved by heat input into the ionization chamber. In electrospraying, for example, ions are produced from a sample substance by spraying charged, ion-containing droplets from a sample liquid into the ionization chamber by applying a high-voltage difference. Some of the droplets disperse due to internal Coulomb repulsion, but some vaporize and thus transfer the ions into the gaseous phase. A heat input into the ionization chamber can, of course, assist the vaporization process, in particular, and thus increase the ion yield.

Furthermore, a heating or desolvation gas can reduce the risk of interfering spray droplets passing through the ion transfer aperture and into the vacuum stage of the mass spectrometer. It is usual to introduce the heat into the chamber by means of a heated gas. Well known are, particularly, designs where this heated drying or desolvation gas is essentially introduced into the chamber parallel to and in the same direction as the spray, or parallel to the axis of the ion transfer aperture in the opposite direction to the ion or droplet flow.

It goes without saying that the gases to be introduced into the ionization chamber must be as free of impurities as possible (in other words as pure as possible) so that the processes taking place in the ionization chamber can be controlled and predicted. The gas supply equipment and lines are also very important in this context because even if the gas has a high degree of purity when taken from a storage container, it can be polluted as it flows through the lines, by mixing with the outgassings of deposits on the lines, for example.

Bearing in mind the explanations given above, there is a need of an improved ionization chamber with temperature-controlled gas feed. Further objectives to be solved by the invention are immediately clear to the person skilled in the art from reading the disclosure below.

SUMMARY OF THE INVENTION

The invention relates to an ionization chamber for connection to a mass spectrometer. The ionization chamber has a temperature-control block with a gas inlet and a gas channel which starts at the gas inlet and discharges into a gas outlet. A temperature-control device is positioned along the gas channel and ensures that a gas flowing in the gas channel is brought to a specific temperature before it enters the ionization chamber. The temperature-control block has a formed part into which a structure of the gas channel is incorporated and which is fabricated by means of a sol-gel process.

The sol-gel process is a method of producing non-metal inorganic or hybrid-polymeric materials from colloidal dispersions, so-called sols (derived from solution). From the starting materials or precursors in solution, a first step involves producing a gelatinous two-phase system containing both a liquid as well as a solid phase, whose consistency ranges from very fine particles to continuous polymer networks. By removing the residual liquid in a second step, for example in a drying process, the gel can be formed into solid bodies with a large variety of geometries, whose complexity is ultimately limited only by the form of the templates or casting molds. The sol-gel process is comparatively low-cost and, importantly, allows low-temperature processing of materials with high melting points, which can otherwise only be formed if a large amount of heat is applied. The method is particularly suitable for workpieces made of ceramic or glass materials, which have a lower risk of contamination than metals, for example.

Formed parts designed to be used in an ionization chamber could, in principle, also be produced by other methods. The structure of the gas channel can be ground out of a planar glass blank, for example. This would require an enormous amount of work though, and the high costs involved practically exclude this type of production for commercial manufacture. It would also be possible to etch the structure of the gas channel into a glass blank. A corresponding suggestion can be read in U.S. Pat. No. 8,044,346 B2 (cf. section "Microchip Nebulizer"), for example. However, an etching method has the disadvantage that there is a limit to the accuracy with which corners and edges of the structure to be produced can be fabricated, and that the finished formed part must be cleaned to remove residual acid (very hazardous hydrofluoric acid, for example) which is a lengthy job. Difficulties arise, furthermore, when the structures to be etched penetrate deep into the substrate, because the etching effect of the acid cannot be limited to the vertical direction, at least not without complicated precautions, but also eats into the side walls.

Moreover, what the two above-mentioned alternatives for fabricating formed parts have in common is that they are generally methods which remove material and thus increase material consumption. It is, furthermore, obvious that a person skilled in the art can distinguish between formed parts fabricated by means of a sol-gel process and formed parts produced using one of the other methods. Grinding leaves behind characteristic marks on the worked surface, for example, and etched components, as already explained, have solely rounded or smoothed edges and quite flat surface structures, whereas sol-gel formed parts have none of these characteristics.

Reference is made to the relevant literature for details of the production of monolithic solid bodies by means of a sol-gel process, for example Fikret Kirkbir et al., *Drying and Sintering of Sol-Gel Derived Large $SiO_2$ Monoliths*, Journal of Sol-Gel Science and Technology 6, 203-217 (1996); A.-M. Siuoffi, *Silica gel-based monoliths prepared by the sol-gel method: facts and figures*, Journal of Chromatography A, 1000 (2003) 801-818; or Koichi Kajihara, *Recent advances in sol-gel synthesis of monolithic silica and silica-* based glasses, Journal of Asian Ceramic Societies 1 (2013) 121-133. Reference can also be made to patent publications, cf. EP 0 131 057 A1, U.S. Pat. No. 5,236,483 A, WO 01/53225 A1, WO 2006/056291 A1, WO 2006/094874 A1, WO 2006/094869 A1, WO 2008/028797 A1 or EP 2 088 128 A1.

The temperature-control block can be constructed from two disk-shaped substrates, one lateral face of each substrate being joined together frontally to form a single block. The structure of the gas channel can comprise a pattern of indentations incorporated into the joining surface of the first disk-shaped substrate (which can then be called a formed part). The opposite surface of the second disk-shaped substrate can be formed so as to be smooth and planar and can close off the opposing channel structure on one side. It is likewise possible, however, to provide both lateral faces of the two substrates to be joined with a recessed structure by means of a sol-gel process so that ultimately both substrates together constitute the formed part. The sol-gel process can, furthermore, be used to produce a smooth, planar substrate which is then joined together with the structured formed part likewise produced with the sol-gel process. In this latter case, the strength of the joint can be particularly enhanced by using the same material (in particular with identical melting point) for the two substrates. It is clear from these explanations that the versatility of the design of the temperature-control block is almost boundless.

The temperature-control block is preferably positioned on the ionization chamber in such a way that it forms part of an external boundary of the ionization chamber, or in other words is embedded into the wall of the ionization chamber in such a way that it forms part of the wall of the chamber. The consequent direct contact with the inside of the ionization chamber has the advantage that the gas is brought to the desired temperature in the immediate vicinity of the chamber, so temperature changes between the temperature-control device and the chamber remain small. This facilitates monitoring of the temperature-control process. Furthermore, the heat (or cold) accumulated in the material of the temperature-control block can additionally be used for the ionization chamber. If the temperature-control device is a heating device, for example, part of the wall of the ionization chamber is thus heated automatically, which counteracts the formation of undesired deposits at these points.

The temperature-control device at the gas channel serves to introduce heat into the gas channel or draw it away from it, i.e. to heat or cool the gas in the channel (temperature control), as required for the application in question. One example of a heating device would be a metal layer, or a layer of another electrical conductor, which is vapor deposited, sputter-deposited, or applied by means of a plasma beam onto one face of the formed part and equipped with electrical contacts so that an electric current passed through it produces resistive heat, which is released to the surroundings (for example the interior of the gas channel). In such a design it is expedient to maximize the length of the gas channel in the temperature-control block so that the gas flowing through is subjected to the heat input for as long as possible. The gas channel can meander through the temperature-control block or follow a labyrinth-like path, preferably utilizing the full dimensions of the block. In order to increase the efficiency of the heat transfer and to save material, it may be expedient for the applied conducting layer (or the temperature-control device in general) to largely follow the path of the gas channel in the formed part. In other words, the heat is only generated or emitted where it can be transferred to the gas in the channel. The energy used for the heating can thus be kept low and, at the same time, the thermal stress of the block material can be controlled and spatially limited also.

A cooling device can be realized in the temperature-control block by providing two parallel but fluidically separate channels, only one of which discharges into the ionization chamber via an outlet, for example. The second fluid channel can then be part of a closed loop which runs both inside and outside the temperature-control block and has a cooling device for a working medium, e.g. a gas or a liquid, flowing in the separate channel. The cooling device cools the working medium to a desired temperature outside the temperature-control block before it enters the temperature-control block, and the working medium thus absorbs heat from the material of the temperature-control block by coming into contact with the channel walls. Continuous circulation of the cooled working medium thus enables heat to be continuously removed from the temperature-controlled gas in the first gas channel via the material of the temperature-control block. The version described here is also suitable as a heating device, of course, if the second working medium in the closed loop is not cooled but heated so that the heat flux is in the opposite direction. In this version also, it can be expedient if the separate channels run next to each other in the temperature-control block for as long a distance as possible in order to maximize the corresponding heat exchange time (heat removal or input). It is most preferable to use the counterflow principle here, i.e. the working media being used in the different channel systems flow in opposite directions.

The gas inlet describes in general one aperture or several apertures in or on the temperature-control block, through which a gas can be fed into the gas channel or, in other words, through which a fluid communication can be generated between the gas channel and a gas source of whatever type, for example by means of a pipe or tube connection to a container of liquefied gas. The temperature-controlled gas is preferably inert in nature in order not to chemically interact with the sample under analysis in the ionization chamber. Examples of an inert gas would be nitrogen or a noble gas such as helium. In certain cases, however, it may also be useful to select a reactive gas such as methane as the temperature-controlled gas, for example if the interaction with the sample in the ionization chamber is considered beneficial, especially for the purpose of bringing about a chemical modification.

It is understood that using the singular of the term "gas inlet" shall not exclude there being more than one gas inlet on the temperature-control block. The same applies to the terms "gas channel" and "gas outlet", of which several can be provided in or on the temperature-control block also. As with the gas inlet, the gas outlet can be considered to be one aperture or several apertures in or on the temperature-control block, through which the (now temperature-adjusted) gas is fed out of the gas channel or gas channels and into the ionization chamber.

To provide an example: The gas inlet can consist of an aperture on or in the temperature-control block, through which the gas is fed into an initially single gas channel. At a point inside the temperature-control block, the gas channel branches into two or more sub-channels, which all lead to separate exit apertures in or on the temperature-control block, through which the temperature-adjusted (i.e. heated or cooled) gas is fed into the ionization chamber. These several separate exit apertures can be termed gas outlet (or gas outlets) in this embodiment, which is provided as an example. Conversely, a branching arrangement within the temperature-control block is also conceivable, in which gas entering the temperature-control block through different entrance apertures (or gas inlets) and suitably connected sub-channels is brought together into a single channel and then enters the ionization chamber through a single exit aperture (or gas outlet). It is also conceivable, of course, for the temperature-control block to have several gas inlet/gas channel/gas outlet arrangements which are separate from each other, if this is deemed to be expedient.

The variety of the arrangements which can be realized is increased significantly by the proposed sol-gel method for producing the formed parts.

BRIEF DESCRIPTION OF THE DRAWINGS

The principles of the invention are explained below with the aid of example embodiments in the illustrations attached, which are often kept schematic for this reason.

DETAILED DESCRIPTION

While the invention has been shown and described with reference to a number of embodiments thereof, it will be recognized by those skilled in the art that various changes in form and detail may be made herein without departing from the scope of the invention as defined by the appended claims.

As has already been mentioned above, the invention proposes an ionization chamber with a temperature-controlled gas feed which is to be connected to a mass spectrometer, said ionization chamber having an advantageously formed temperature-control block for heating or cooling a gas which is to be fed into the chamber. Below, specific example embodiments of ionization chambers with temperature-control blocks are presented in a very schematic way and more to illustrate the general principles, from which the specialist can easily draw conclusions about the scope and the benefit of the new features according to the invention.

Figure 1:
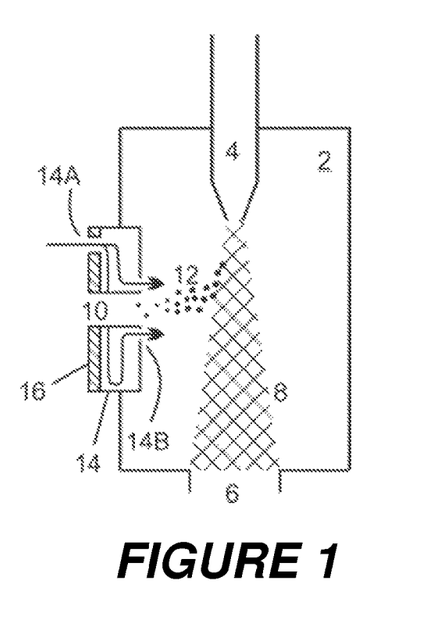
FIG. 1 shows an embodiment of an ionization chamber in a lateral view.

FIG. 1 shows a schematic cross-sectional, lateral view of a first example of an ionization chamber 2, in which a sample is ionized with the aid of a spraying process. Electrospray ionization (ESI) would be an example of such an ionization process. The chamber 2 has a spray nozzle 4, which (at the top end as shown in the illustration) receives a sample liquid, which is then sprayed (in the downwards direction in the illustration). The depiction of the spray nozzle 4 must be understood as being purely schematic. A specialist in the field who is familiar with ESI will immediately recognize that, for example, the spraying of the sample liquid can be assisted by the coaxial and parallel introduction of a nebulization gas such as pure nitrogen, because the droplet size in the spray mist is advantageously reduced by the effect of the nebulization gas, and this in turn improves the ion yield. A specialist will also immediately recognize that the droplet formation and the gradual reduction in size of the sprayed charged droplets in the electrospray process is promoted by means of an electric potential gradient, usually of a few kilovolts, which is applied between the spray nozzle 4 and a counterelectrode not marked here.

Opposite the spray nozzle 4, the ionization chamber 2 also has an exhaust outlet 6, through which the remaining, non-vaporized spray droplets or other residual gas (together with any unused ions) is removed from the chamber 2, e.g. by pumping off. In the example shown, the dimensions of the outlet 6 are such that it can accept the whole of spray cone 8 produced by the spray nozzle 4. This design has proved to be expedient, especially for avoiding interfering gas recirculation. On the side of the ionization chamber 2, between the spray nozzle 4 and the gas outlet 6, there is an ion transfer aperture 10, which forms an interface between a first pressure regime in the ionization chamber 2 (usually atmospheric pressure; occasionally a pressure between around $10^2$ and $10^5$ pascal) and a second pressure regime in a first vacuum stage of a connected mass spectrometer (usually between around $10^3$ and 10 pascal). Instead of a simple aperture 10, the ion transfer device can, of course, also comprise an elongated capillary, which has the advantage of a higher gas flow resistance. Owing to the pressure difference between the two regimes, the spray liquid becomes vaporized gas. Ions contained and entrained in the gas, and also a few (smaller) spray droplets (shown together at 12), are drawn out from the spray cone 8 and driven towards aperture 10. This "migratory motion" of at least the charged (gas) particles is assisted by the electric potential of the above-mentioned, ESI counterelectrode (not marked), which is usually positioned close to, or even around, the transfer aperture 10 for this purpose. It is conceivable (and quite usual) to design the counterelectrode as a cone, for example, whose apex has an aperture which is aligned concentrically and coaxially with the ion transfer aperture 10.

The passage of charged, relatively large spray droplets through the ion transfer aperture 10 together with the desired sample ions carries the risk that deposits may form on the edges of the transfer aperture 10 itself and on the electrodes (not shown), which serve to guide the comparatively light ions on the onward ion path to and in the vacuum stage. This may occur if the droplets are, for example, so heavy that they cannot be stored by electric RF pseudopotentials, unlike the light ions. Deposits on the electrodes can, on the one hand, lead to cross-contamination of different samples and, on the other, to electrostatic charging of the electrode surface responsible for actually conducting the ions, which affects the electric field around the electrode. In order to avoid these potential difficulties, a heated drying or desolvation gas can be used, which is blown into the ionization chamber 2 in the opposite direction to the stream of droplets and which thus vaporizes the droplets, preferably completely, into ions and neutral gas.

On the left of FIG. 1 is a temperature-control block 14, which is positioned directly around the ion transfer aperture 10 and has a gas inlet 14A to take up a drying or desolvation gas, and several gas outlets 14B (two of which are visible in the cross-sectional view shown) to feed the now heated gas into the ionization chamber 2. The gas outlets 14B are arranged and aligned in such a way that the gas flow exiting from them (in the direction of the arrow) is essentially in the opposite direction to the stream of charged droplets, the neutral gas, and the ions 12 moving from the spray cone 8 toward the transfer aperture 10. The temperature-control block 14 can be made of a glass or ceramic material and can be manufactured in a way which will be explained in more detail below. In the example shown, the temperature-control block 14 has a layer 16 of an electrically conducting material applied to one side, for example a metal such as platinum, which can act as a heating resistor when equipped with appropriate contacts. When an electric current is applied to the heating resistor, resistive heat is generated, which is guided via the material of the temperature-control block 14 into the channel (or channels) for the drying gas or desolvation gas incorporated therein.

In the example embodiment shown, the charged droplets 12 drawn out of the spray cone 8 are vaporized further by the counterstream of the heated gas until preferably only charged and neutral gas particles are present, and therefore the edges of the transfer aperture 10 and the electrodes within the neighboring vacuum stage(s) remain free of interfering deposits to a large extent. It is very easy to separate the neutral gas produced from the spray droplets and the ions in the vacuum stage by subjecting them to RF electric fields. The neutral gas is usually pumped off here in order to maintain the desired pressure level in the vacuum system.

As can be seen from FIG. 1, the temperature-control block 14 is mounted in a side wall of the ionization chamber 2 and forms part of it. This has the advantage that the temperature-adjusted gas enters the chamber 2 immediately after the heat exchange in the temperature-control device without any further temperature changes. Furthermore, the heat present in the temperature-control block 14 can radiate into the ionization chamber 2 and prevent the formation of deposits which encourage cross-contamination on the temperature-control block 14, for example.

Figure 2:
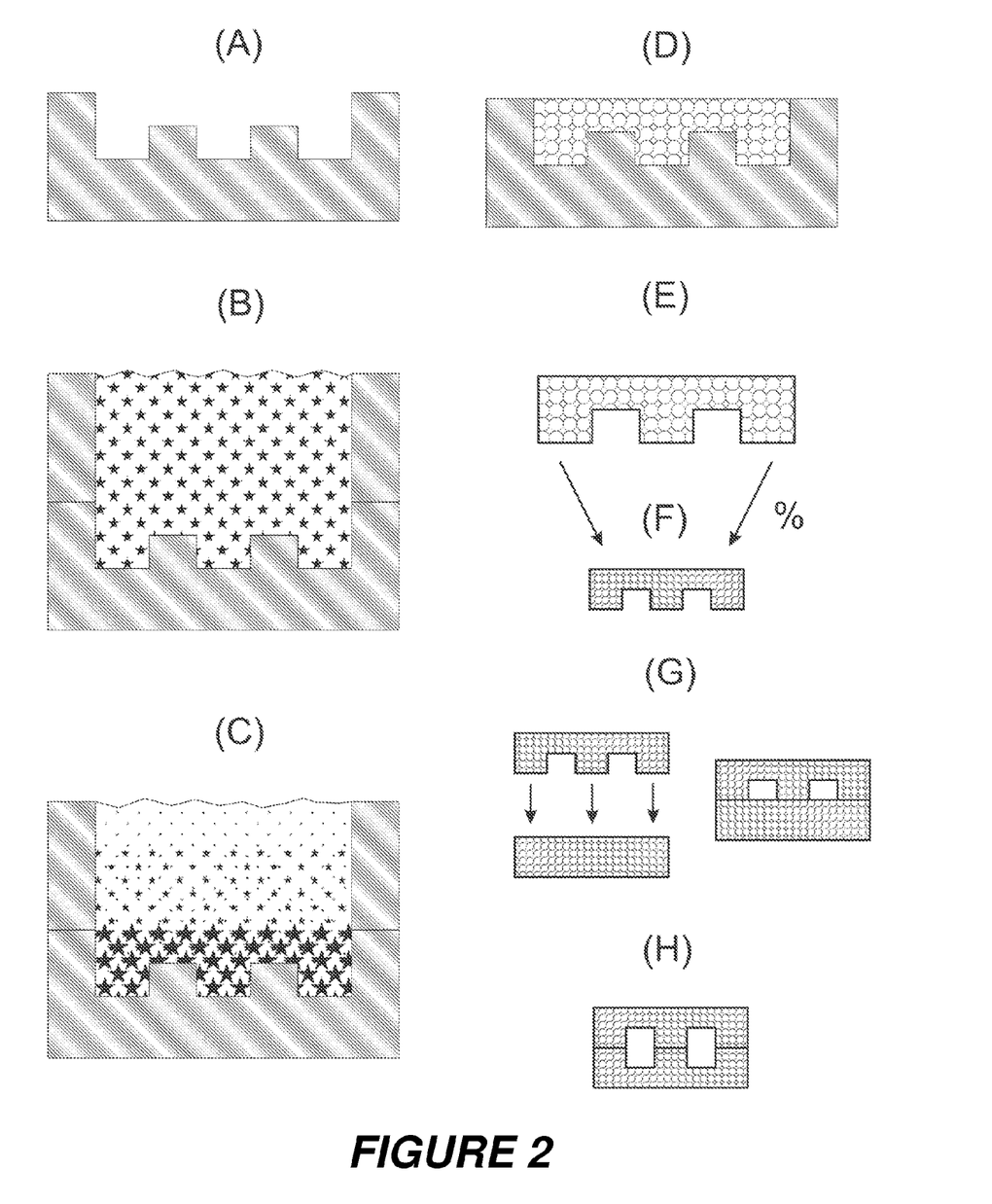
FIG. 2 shows a schematic of the stages of a sol-gel process to produce a formed part.

Below, the manufacture of a temperature-control block by means of a sol-gel process is illustrated schematically and greatly simplified, with reference to FIG. 2. First a casting mold is provided, whose shape is an inverse (a negative, so to speak) of the shape of the gas channel structure and thus gives the sol-gel formed part its shape (A). The sol is put into the casting mold, whose side walls are extended in order to accommodate the volume of liquid, which is many times larger than that of the usable solids (B). As the gel forms, which essentially involves the cross-linking of the solid-phase components contained in the solution, a sediment of the cross-linking solids forms, while the liquid phase of the sol remains as the supernatant (C). This residual solution must subsequently be removed, either by repeated scooping out and/or by the effect of heat which vaporizes the liquid (D). The fine or coarse-grained "green body" resulting from the further solidification is removed from the mold (E) and can then be finished by sintering to give a monolithic formed part, which has only small pores with correspondingly minimal (characteristic) air inclusions.

As has already been mentioned, the shape of the formed part corresponds to an "imprint" of the structure of the casting mold. The densification brought about by the sintering usually leads to a perceptible shrinking of the formed part, and this must be taken into account when deciding on the dimensions of the casting mold, depending on the desired target dimensions of the formed part, but this is simple to determine empirically (F). The structured formed part thus produced can then be joined together with another substrate to create a temperature-control block, preferably in such a way that the gas channel structure is closed off toward the open side and only the inlets and outlets provided (not shown) remain open (G).

The other substrate preferably consists of the same material as the formed part because then the joint between the two substrates is particularly durable and robust. It can also be a different material, however. It is, furthermore, possible to also produce the other substrate with a sol-gel process, for example in a casting mold with no internal structure on the base. Moreover, both substrates to be joined can in principle have an internal, complementary structure, if this is deemed to be useful (H). The versatility of the manufacturing process and the variety of shapes of the formed part know almost no bounds in this respect.

Figure 3:
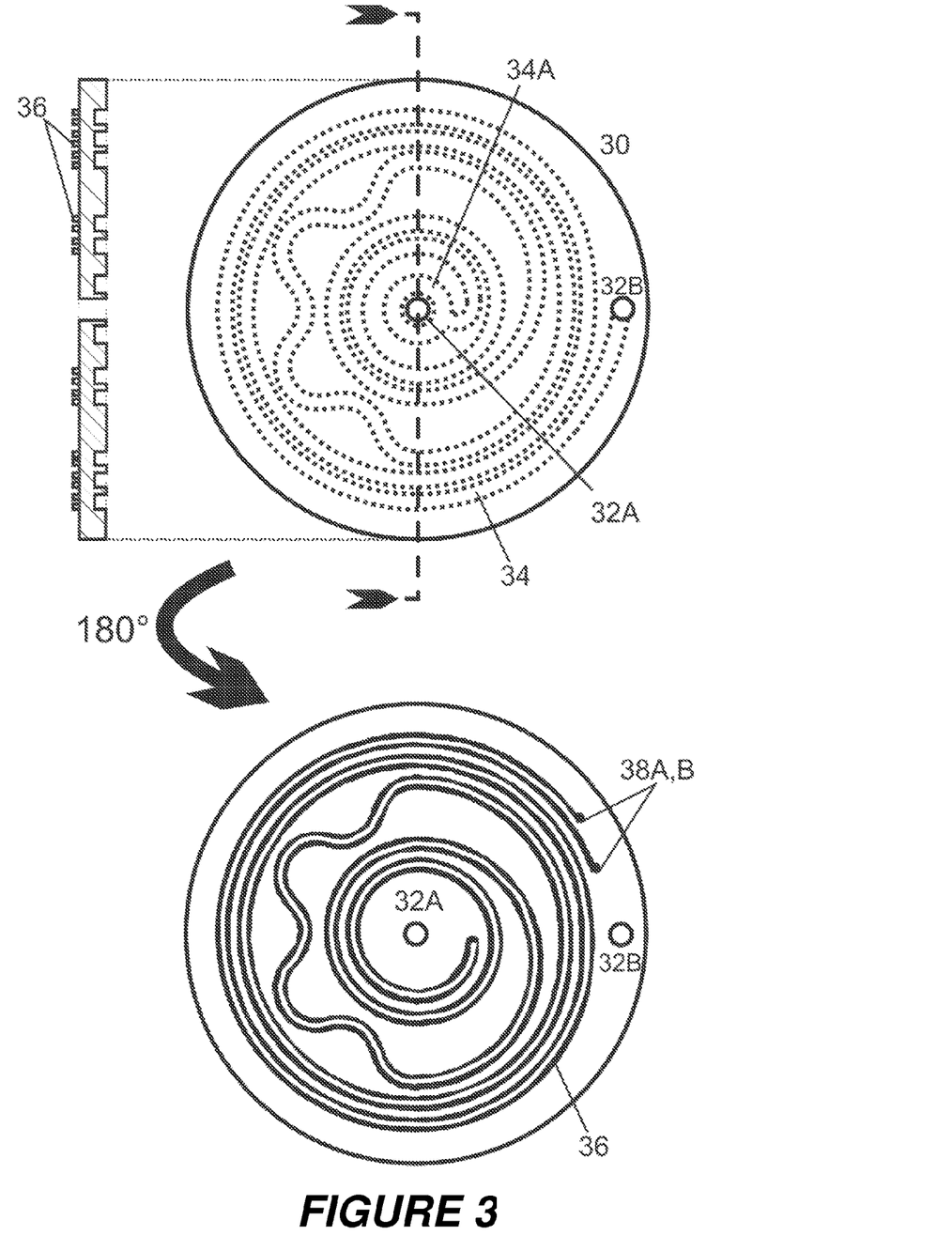
FIG. 3 shows an example embodiment of a formed part produced by means of a sol-gel process.

FIG. 3 shows, by way of example, a possible embodiment of a formed part 30 that can be used in a temperature-control block on an ionization chamber. The rough outer contour of the formed part 30 can be described as a circular disk. The structure of a gas channel (delimited by dotted lines) is incorporated on a flat face of the disk by means of the aforementioned sol-gel process, as can be seen from the plan view depicted. The disk-shaped formed part 30 has a through opening 32A, 32B on its periphery and also in its center, which connects the space above and below the formed part 30. The central opening 32A will act as the ion transfer aperture in the finished temperature-control block. The opening on the periphery 32B is designed to feed a gas into the gas channel, and can be termed a gas inlet. Starting from this through opening 32B at the periphery, an elongated indentation or groove 34 runs along one flat side of the formed part 30, largely in the form of a spiral toward the center until it reaches a central, annular indentation 34A in the center of the formed part, which acts as the distribution point for the feeding of the (now temperature-adjusted) gas to the exit aperture (or apertures). In certain sections, the gas channel 34 can also trace a wave-shaped path, as illustrated, in order to avoid possible support or mounting structures on the substrate, such as pins or holes to take screws (not shown). As can be seen in the cross-sectional view on the left, the loops of the gas channel 34 sometimes run closely side by side, so there is only a relatively thin separating wall between the various sections of gas channel 34. As has already been discussed, it is advantageous to design the gas channel 34 so that its path covers the whole available area in the formed part 30, if possible, in order to maximize the heating or cooling effect. The physical strength and thermal stability of the substrate material in continuous use must also be taken into account, of course.

Furthermore, as shown in the bottom part of FIG. 3, the side of formed part 30 opposite to the side with the gas channel structure 34 has a heating device in the present example, which takes the form of a heating conductor 36 applied as a layer. It is preferable for the heating conductor layer 36 to largely follow the path of the elongated indentation or groove 34 for the gas channel on the other side of the formed part in order to ensure that the heat exchange path is as long and direct as possible and to keep the amount of energy needed low. As can be seen in the view of the reverse side of the formed part in the bottom section of FIG. 3, the heat conductor 36 starts at the periphery of the formed part 30 close to the outer through opening 32B and follows the gas channel 34 up to a point just before it discharges into the central, annular indentation 34A. It is laid out as a counter-arrangement here, which means that the two electrical contact points 38A,B are adjacent to each other at the periphery, and the electric current flows along the gas channel route 34 almost right up to the center, and after a 180° turnaround it returns from there again to a peripheral location close to the starting point.

Figure 4:
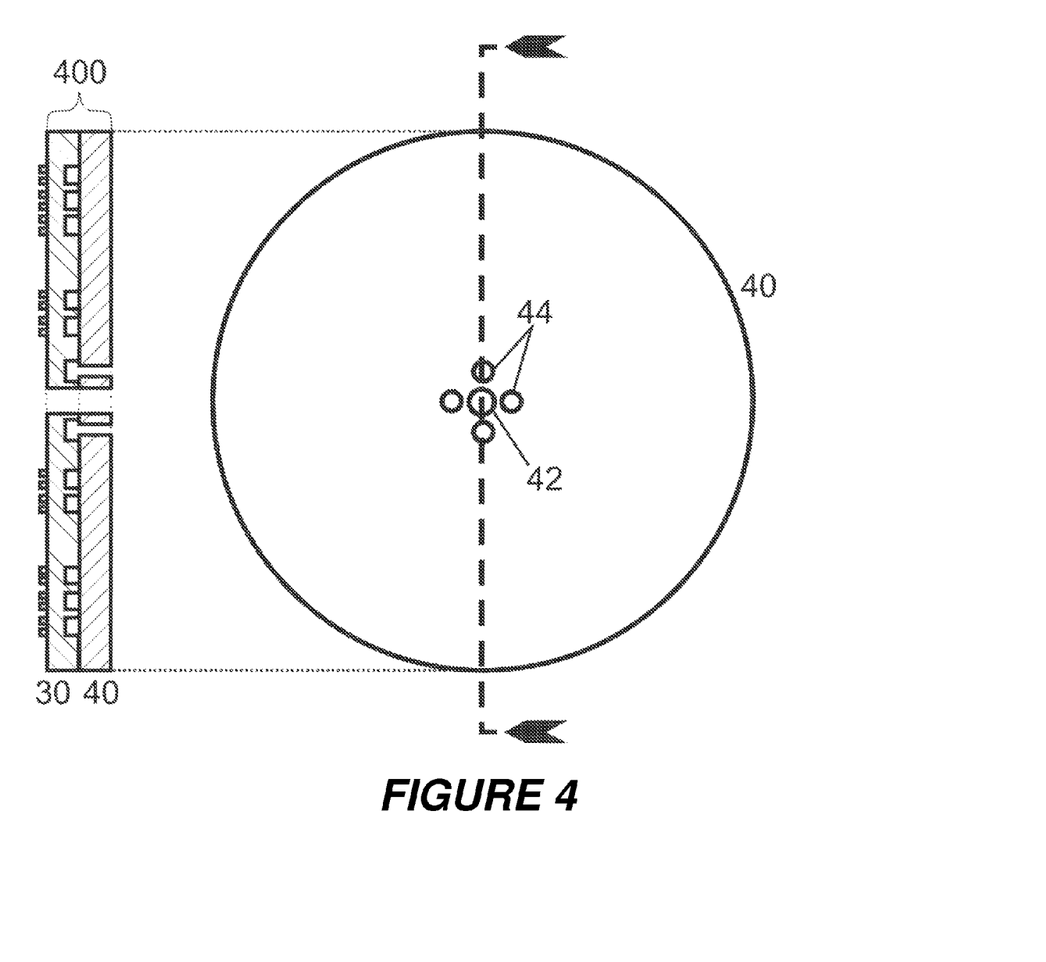
FIG. 4 shows a cross-sectional view of a temperature-control block which consists of a formed part and another substrate.

The formed part 30 shown in FIG. 3 can be joined with a further disk-shaped substrate 40, as can be seen in FIG. 4, to form a temperature-control block 400. The second substrate 40 preferably has the same outer dimensions as the formed part 30, which is produced using a sol-gel process, so that a flush joint is possible without any overhang. In the present example, the second substrate 40, which can in principle also be manufactured using a sol-gel process, differs from a circular monolithic disk in that it has four additional through openings 44, which are grouped around the central aperture 42 and connect the upper side and the lower side of the second substrate 40 in fluidic terms. The number four is used here only by way of example; in principle, any number of apertures 44 can be provided if it is expedient for the design of the temperature-control block 400. The present apertures 44 near the center are designed as outlet apertures on the temperature-control block 400 and are dimensioned so as to be located opposite the central, annular indentation 34A in the formed part 30. The gas entering the central, annular indentation 34A of the formed part 30 from the gas channel 34 can then leave the temperature-control block 400, formed by the formed part 30 and the second substrate 40, through the exit port(s) 44 of the second substrate 40, and enter the ionization chamber. It is scarcely necessary to mention that the surface of the second substrate 40 between the through openings 44 close to the center and the periphery covers the gas channel structure 34 in the formed part 30 and thus closes the gas channel to one side.

Figure 7:
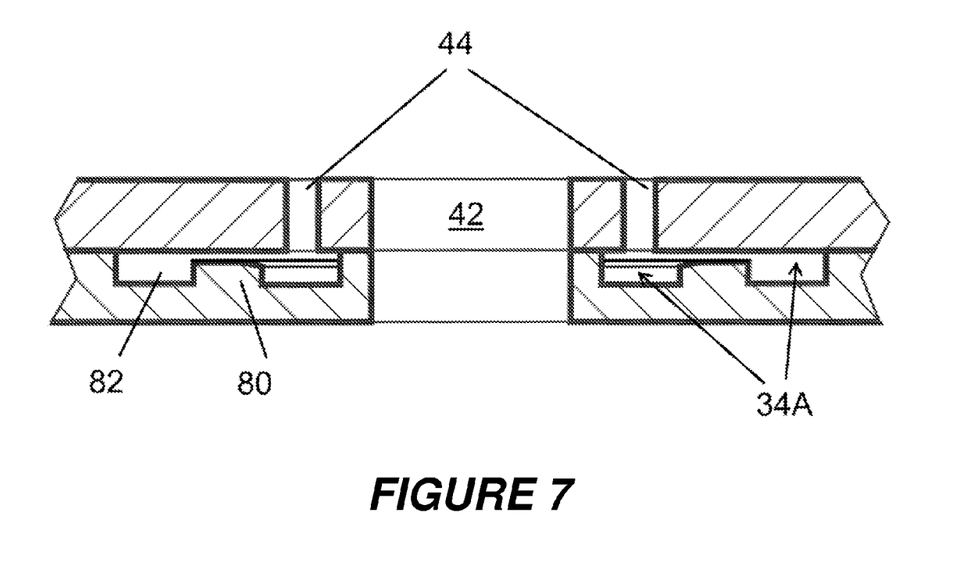
FIG. 7 is a cross-sectional view of a modification of the design from FIG. 4.

In a slight modification of the design shown in the left cross-section from FIG. 4 (see FIG. 7), the annular indentation 34A surrounding the central aperture 42 can have an additional overflow barrier 80 for the temperature-controlled gas, said barrier being positioned between the outer wall of the indentation 34A and the through openings 44. Such an overflow barrier 80 ensures, in particular, that the gas fed locally to the indentation 34A can spread uniformly across the outer annular space 82 before it clears the additional barrier 80 and flows through the openings 44. This provides a means of compensating for non-uniform pressure conditions and flow dynamics caused by the local gas feed at the periphery. Moreover, the sol-gel process makes it very easy to incorporate such an overflow barrier 80 into the formed part making up the temperature-control block. Here too, the versatility of the production method has a positive effect.

Figure 5:
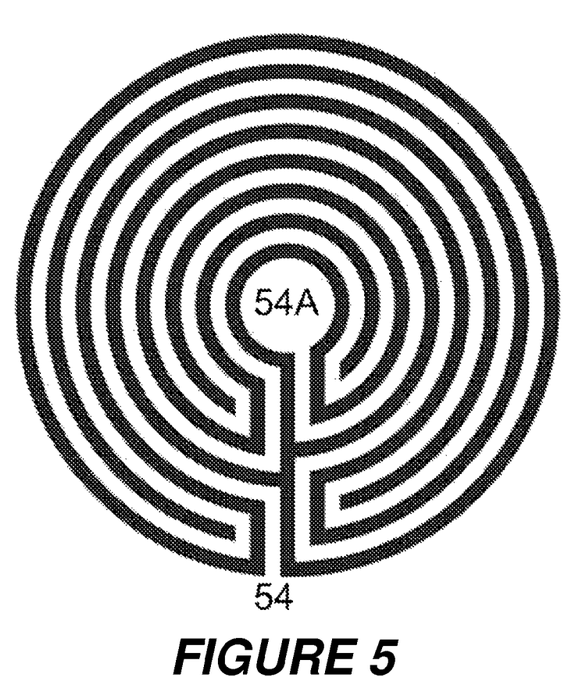
FIG. 5 is a schematic representation of a possible labyrinthine path of a gas channel in the temperature-control block.

With reference to FIG. 5, it will be explained, by way of example, how the available area can be used to optimum effect with a circular disk-shaped substrate. In this respect, FIG. 5 shows the representation of a "medieval labyrinth", which has one single path or channel 54 (i.e. with no branches or dead ends) stretching from a periphery via several turns to finish at 54A in the center of the disk (light background; channel walls in black). Fundamentally, such a configuration for the gas channel can be transferred to the formed part manufactured by means of the sol-gel process in accordance with the device described here. It is understood that, in such a case, the central ion transfer aperture, which is surrounded by an annular groove, would have to be added. This further possible embodiment has the additional characteristic, in contrast to the one shown in FIG. 3, that the inlet runs perpendicular to the flat side of the disk, i.e. is positioned on the narrow side of the disk. It is clear that this special feature can also be transferred to other embodiments, i.e. that it is not necessary to feed the temperature-controlled gas into the gas channel via the flat side. It is, furthermore, evident that the labyrinth shown represents only an example, and there are further types of branchless labyrinths which make optimum use of the area available which can also be used as part of the present disclosure.

Figure 6:
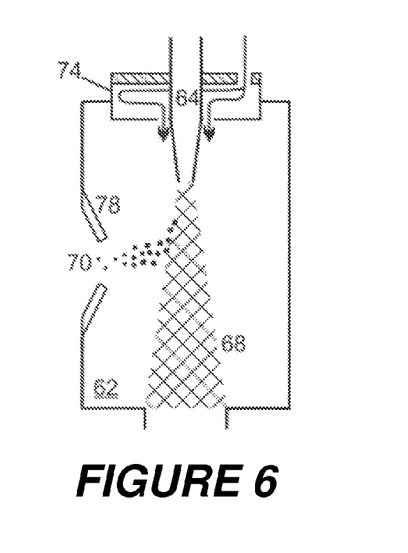
FIG. 6 shows a further example embodiment of an ionization chamber in a lateral view.

FIG. 6 shows a version of an electrospray ion source in which a temperature-control block 74 manufactured by means of a sol-gel process can be used. In contrast to FIG. 1, the temperature-control block 74 is positioned around the spray capillary 64, with the central aperture serving as the feedthrough. The temperature-adjusted gas is then fed into the ionization chamber 62, parallel to and in the same direction as the spray cone 68 so that it can serve as a nebulization gas to mechanically assist in reducing the size of the droplets and/or as a drying or desolvation gas to promote vaporization of the spray droplets. In this example, the ion transfer aperture 70 consists of a hole in a conical diaphragm 78, which projects into the ionization chamber 62. It is clear that a temperature-control block 14, 74 in embodiments which combine the characteristic features of FIGS. 1 and 6 can be located both around the ion transfer aperture 10, 70 as well as at the capillary 4, 64. The creative freedom in this respect knows no bounds.

The invention has been described with reference to a number of different embodiments thereof. It will be understood, however, that various aspects or details of the invention may be changed, or various aspects or details of different embodiments may be arbitrarily combined, if practicable, without departing from the scope of the invention. Generally, the foregoing description is for the purpose of illustration only, and not for the purpose of limiting the invention which is defined solely by the appended claims.

The invention claimed is:

1. An ionization chamber to be connected to a mass spectrometer, said ionization chamber having a temperature-control block with a gas inlet and a gas channel which starts at the gas inlet and discharges into a gas outlet, and further having a temperature-control device being positioned along the gas channel to ensure that a gas flowing in the gas channel is brought to a specific temperature before it enters the ionization chamber, wherein the temperature-control block comprises a formed part into which the structure of the gas channel is incorporated and wherein the gas inlet has one aperture on or in the temperature-control block, through which the gas is fed into the initially single gas channel, and inside the temperature-control block the gas channel branches into two or more sub-channels, which all lead to separate exit apertures in or on the temperature-control block, and through which the temperature-adjusted gas is fed into the ionization chamber.

2. The ionization chamber according to claim 1, wherein the formed part is made of a glass or ceramic material.

3. The ionization chamber according to claim 1, wherein the formed part has a disk-shaped substrate which is joined together with a second disk-shaped substrate on a flat face to create the temperature-control block.

4. The ionization chamber according to claim 3, wherein the structure of the gas channel comprises a pattern of indentations incorporated on the joining side of the formed part.

5. The ionization chamber according to claim 3, wherein the opposite face of the second disk-shaped substrate is smooth and planar and closes off the channel structure of the formed part on one face, or both of the lateral faces of the two substrates to be joined are provided with a recessed structure by means of a sol-gel process so that both substrates together constitute the formed part.

6. The ionization chamber according to claim 3, wherein the two substrates are made from the same material.

7. The ionization chamber according to claim 3, wherein the temperature-control device has a heating device which takes the form of an electrical conductor applied by vapor deposition, sputtering or a plasma beam to one side of the formed part or of the second disk-shaped substrate, and which is provided with electrical contacts in such a way that resistive heat is generated when an electric current is passed through.

8. The ionization chamber according to claim 1, wherein the temperature-control device has a heating device which takes the form of an electrical conductor applied by vapor deposition, sputtering or a plasma beam to one side of the formed part or of the second disk-shaped substrate, and which is provided with electrical contacts in such a way that resistive heat is generated when an electric current is passed through.

9. The ionization chamber according to claim 1, wherein the gas inlet is positioned at one of a flat side and a narrow side of the formed part.

10. The ionization chamber according to claim 1, wherein the structure of the formed part, in addition to walls that separate different sections of the gas channel, also has raised features which serve as gas flow restrictions to control the gas flow dynamics.

11. The ionization chamber according to claim 1, wherein the meandering gas channel takes substantially the shape of a spiral.

12. The ionization chamber according to claim 1, wherein the temperature-control device replicates the path of the gas channel in the formed part.

13. An ionization chamber to be connected to a mass spectrometer, said ionization chamber having a temperature-control block with a gas inlet and a gas channel which starts at the gas inlet and discharges into a gas outlet, and further having a temperature-control device being positioned along the gas channel to ensure that a gas flowing in the gas channel is brought to a specific temperature before it enters the ionization chamber, wherein the temperature-control block comprises a formed part into which the structure of the gas channel is incorporated, and wherein the temperature-control device in the temperature-control block has two parallel but fluidically separate channels, one of which enters the ionization chamber via the gas outlet, whereas the second channel is part of a closed loop which runs inside and outside the temperature-control block and has a heating or cooling device for a working medium which circulates continuously in the separate channel.

14. An ionization chamber to be connected to a mass spectrometer, said ionization chamber having a sample feed that introduces an analytical sample to be ionized there-into and further having a temperature-control block that includes a gas inlet and a meandering gas channel which starts at the gas inlet, extends over a plurality of windings or turnings and discharges into a gas outlet, the gas inlet, meandering gas channel and gas outlet being structurally separate from the sample feed, the chamber further having a temperature-control device being positioned along the meandering gas channel such that it replicates substantially a path of the meandering gas channel to ensure that a meandering gas flowing in the meandering gas channel is brought to a specific temperature indirectly via the temperature-control block, which is in thermal contact with the temperature-control device, before it enters the ionization chamber for promoting ionization of the analytical sample, wherein the temperature-control block comprises a formed part into which the structure of the meandering gas channel is incorporated and which is manufactured by means of a sol-gel process.

15. An ionization chamber to be connected to a mass spectrometer, said ionization chamber having a temperature-control block with a gas inlet and a gas channel which starts at the gas inlet and discharges into a gas outlet, and further having a temperature-control device being positioned along the gas channel to ensure that a gas flowing in the gas channel is brought to a specific temperature before it enters the ionization chamber, wherein the temperature-control block comprises a formed part into which the structure of the gas channel is incorporated, and wherein gas enters the temperature-control block through more than one gas inlet and suitably connected subchannels and is brought together in a single channel before entering the ionization chamber.

16. The ionization chamber according to claim 1, wherein the temperature-control block forms part of the wall of the ionization chamber.

17. The ionization chamber according to claim 1, wherein the temperature-control block is located about at least one of a spray nozzle and an ion transfer aperture leading to a different pressure regime.

18. The ionization chamber according to claim 17, further comprising a voltage generator to generate a potential gradient between the spray nozzle and a conductive member around the ion transfer aperture so as to facilitate an electrospray process.

19. The ionization chamber according to claim 1, wherein the gas channel is configured to receive and pass through one of an inert gas and a reactive gas.

20. The ionization chamber according to claim 1, wherein the formed part is manufactured by means of a sol-gel process.

* * * * *